B. W. HAMMOND.
VEHICLE WHEEL.
APPLICATION FILED MAY 26, 1910.
976,360.
Patented Nov. 22, 1910.
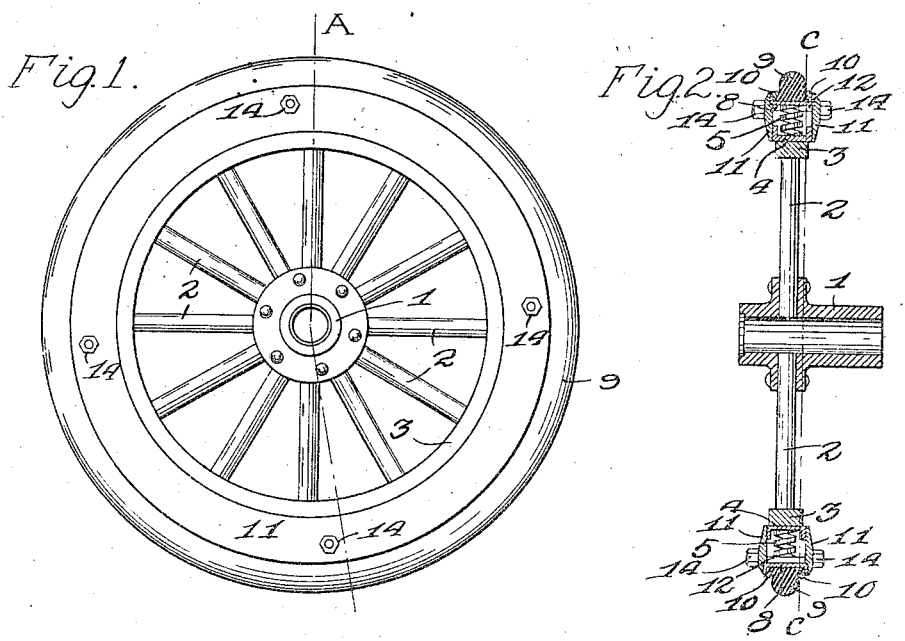
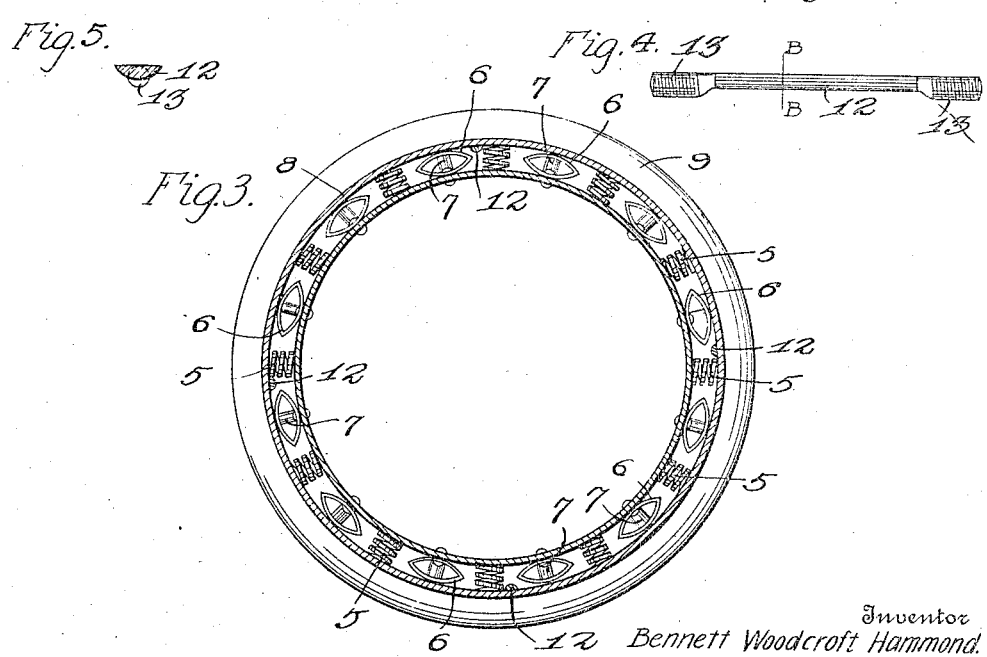
Inventor
Bennett Woodcroft Hammond.
Witnesses
W. A. Stock.
H. C. Schroeder.
By E. E. Vrooman,
Attorney

UNITED STATES PATENT OFFICE.

BENNETT WOODCROFT HAMMOND, OF RICHMOND, CALIFORNIA.

VEHICLE-WHEEL.

976,360.

Specification of Letters Patent.  Patented Nov. 22, 1910.

Application filed May 26, 1910. Serial No. 563,523.

*To all whom it may concern:*

Be it known that I, BENNETT WOODCROFT HAMMOND, a citizen of the United States, residing at Richmond, in the county of Contra Costa and State of California, have invented certain new and useful Improvements in Vehicle-Wheels, of which the following is a specification.

This invention relates to wheels for motor or other vehicles, and the principal object of the same is to provide a wheel with cushioning means that will contribute to the ease and comfort of riding without the annoyances that are incidental to the use of pneumatic tires.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of a wheel constructed in accordance with this invention. Fig. 2 is a vertical sectional view taken on the line A—A, Fig. 1. Fig. 3 is a vertical sectional view taken on the line C—C, Fig. 2, the hub and spokes being omitted. Fig. 4 is a detail view of a connecting bolt used in this invention. Fig. 5 is a transverse sectional view taken on the line B—B, Fig. 4.

Referring to the accompanying drawings by numerals, 1 designates the hub of the improved wheel which carries the usual spokes 2 upon which the felly 3 is supported. Said felly 3 is inclosed by a channel plate 4 upon which the springs 5 and 6 are mounted in regularly spaced relation. The springs 5 are preferably spiral and the springs 6 are preferably elliptical although it will be understood that other types of springs may be employed. Springs 6 are provided with the central, resilient buffers 7. An outer channel plate 8 is carried by the springs 5 and 6, said plate having the tire 9 seated therein and held thereto by the fastening bands 10.

Channel plate 8 is provided with flat, circular side plates 11 which are clamped thereto by the bolts 12. Said bolts, as shown in Figs. 4 and 5 are flattened on one side so that they will lie close to the under surface of plate 8 and their ends 13 are enlarged and threaded. Lock nuts 14 are employed for rigidly holding the bolts in position to clamp plates 11 to opposite sides of the channel plate 8. Said plates 11 overlap the side flanges of channel plate 4, and are slidable thereon.

It will be seen from the foregoing that the improved wheel will readily yield through the spring connection between the plates 4 and 8 so that the shocks and jars will be absorbed, and also that the described arrangement of parts of the wheel and the manner of connecting the same, permits said parts to be readily separated when necessary or desirable.

What I claim as my invention is:—

A wheel provided with a felly plate, cushioning means carried thereby, a tire plate seated on said cushioning means, side plate for the tire plate, bolts carried by the side plates for clamping the same to the tire and in slidable relation to the felly plate, said bolts provided with a flat longitudinal portion that is held in contact with the tire plate.

In testimony whereof I affix my signature in presence of two witnesses.

BENNETT WOODCROFT HAMMOND.

Witnesses:
H. C. SCHROEDER,
F. P. SCHROEDER.